US012772180B2

(12) United States Patent
Bai et al.

(10) Patent No.: US 12,772,180 B2
(45) Date of Patent: Oct. 20, 2026

(54) POWER CONTROL CONFIGURATION

(71) Applicant: QUALCOMM Incorporated, San Diego, CA (US)

(72) Inventors: Tianyang Bai, Mountain View, CA (US); Yan Zhou, San Diego, CA (US); Fang Yuan, Beijing (CN); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 18/291,411

(22) PCT Filed: Oct. 1, 2021

(86) PCT No.: PCT/CN2021/122485

§ 371 (c)(1),
(2) Date: Jan. 23, 2024

(87) PCT Pub. No.: WO2023/050444

PCT Pub. Date: Apr. 6, 2023

(65) Prior Publication Data

US 2025/0106781 A1 Mar. 27, 2025

(51) Int. Cl.
*H04W 52/24* (2009.01)
*H04W 52/14* (2009.01)

(52) U.S. Cl.
CPC ....... *H04W 52/248* (2013.01); *H04W 52/146* (2013.01)

(58) Field of Classification Search
CPC ............ H04W 52/248; H04W 52/146; H04W 52/325; H04W 52/281
See application file for complete search history.

(56) References Cited

U.S. PATENT DOCUMENTS

2011/0038271 A1 2/2011 Shin et al.
2017/0265148 A1* 9/2017 Balasubramanian ........................ H04W 52/248
2019/0124598 A1* 4/2019 Fakoorian ............ H04L 5/0035
2020/0145079 A1 5/2020 Marinier et al.

FOREIGN PATENT DOCUMENTS

WO 2021030674 A1 2/2021
WO 2021146161 A1 7/2021

OTHER PUBLICATIONS

International Search Report and Written Opinion—PCT/CN2021/122485—ISA/EPO—Jun. 23, 2022.

* cited by examiner

*Primary Examiner* — Ayodeji O Ayotunde
(74) *Attorney, Agent, or Firm* — Harrity & Harrity, LLP

(57) ABSTRACT

A user equipment (UE) (120) may receive signaling identifying a plurality of power control configurations (505), wherein each power control configuration, of the plurality of power control configurations, includes one or more power control parameters. The UE may transmit uplink traffic using a power control configuration (515), of the plurality of power control configurations, selected based at least in part on a channel type.

20 Claims, 12 Drawing Sheets

POWER CONTROL CONFIGURATION

CROSS-REFERENCE TO RELATED APPLICATION

This Patent Application is a 371 National Stage of Patent Cooperation Treaty (PCT) Patent Application No. PCT/CN2021/122485, filed on Oct. 1, 2021, entitled "POWER CONTROL CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power control configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving signaling identifying a plurality of power control configurations, where each power control configuration, of the plurality of power control configurations, includes one or more power control parameters. The method may include transmitting uplink traffic using a power control configuration, of the plurality of power control configurations, selected based at least in part on a channel type.

Some aspects described herein relate to a method of wireless communication performed by a UE. The method may include receiving, from a base station, information configuring a set of resources associated with a set of pathloss reference signals. The method may include identifying a pathloss reference signal, of the set of pathloss reference signals, based at least in part on a UE capability. The method may include communicating with the base station based at least in part on identifying the pathloss reference signal.

Some aspects described herein relate to a method of wireless communication performed by a base station. The method may include transmitting signaling identifying a plurality of power control configurations, where each power control configuration, of the plurality of power control configurations, includes one or more power control parameters. The method may include receiving uplink traffic transmitted using a power control configuration, of the plurality of power control configurations, associated with a channel type.

Some aspects described herein relate to a method of wireless communication performed by a base station. The method may include transmitting, to a UE information configuring a set of resources associated with a set of pathloss reference signals. The method may include configuring a pathloss reference signal, of the set of pathloss reference signals, for the UE based at least in part on a UE capability. The method may include communicating with the UE based at least in part on configuring the pathloss reference signal.

Some aspects described herein relate to a UE for wireless communication. The user equipment may include a memory and one or more processors coupled to the memory. The one or more processors may be configured to receive signaling identifying a plurality of power control configurations. The one or more processors may be configured to transmit uplink traffic using a power control configuration, of the plurality of power control configurations, selected based at least in part on a channel type.

Some aspects described herein relate to a UE for wireless communication. The UE may include a memory and one or more processors coupled to the memory. The one or more processors may be configured to receive, from a base station, information configuring a set of resources associated with a set of pathloss reference signals. The one or more processors may be configured to identify a pathloss reference signal, of the set of pathloss reference signals, based at least in part on a UE capability. The one or more processors may be configured to communicate with the base station based at least in part on identifying the pathloss reference signal.

Some aspects described herein relate to a base station for wireless communication. The base station may include a memory and one or more processors coupled to the memory. The one or more processors may be configured to transmit signaling identifying a plurality of power control configurations. The one or more processors may be configured to receive uplink traffic transmitted using a power control configuration, of the plurality of power control configurations, associated with a channel type.

Some aspects described herein relate to a base station for wireless communication. The base station may include a memory and one or more processors coupled to the memory. The one or more processors may be configured to transmit, to a UE information configuring a set of resources associated with a set of pathloss reference signals. The one or more processors may be configured to configure a pathloss reference signal, of the set of pathloss reference signals, for the UE based at least in part on a UE capability. The one or more processors may be configured to communicate with the UE based at least in part on configuring the pathloss reference signal.

Some aspects described herein relate to a non-transitory computer-readable medium that stores a set of instructions for wireless communication by a UE. The set of instructions, when executed by one or more processors of the UE, may cause the UE to receive signaling identifying a plurality of power control configurations. The set of instructions, when executed by one or more processors of the UE, may cause the UE to transmit uplink traffic using a power control configuration, of the plurality of power control configurations, selected based at least in part on a channel type.

Some aspects described herein relate to a non-transitory computer-readable medium that stores a set of instructions for wireless communication by a one or more instructions that, when executed by one or more processors of a UE. The set of instructions, when executed by one or more processors of the one or more instructions that, when executed by one or more processors of a UE, may cause the one or more instructions that, when executed by one or more processors of a UE to receive, from a base station, information configuring a set of resources associated with a set of pathloss reference signals. The set of instructions, when executed by one or more processors of the one or more instructions that, when executed by one or more processors of a UE, may cause the one or more instructions that, when executed by one or more processors of a UE to identify a pathloss reference signal, of the set of pathloss reference signals, based at least in part on a UE capability. The set of instructions, when executed by one or more processors of the one or more instructions that, when executed by one or more processors of a UE, may cause the one or more instructions that, when executed by one or more processors of a UE to communicate with the base station based at least in part on identifying the pathloss reference signal.

Some aspects described herein relate to a non-transitory computer-readable medium that stores a set of instructions for wireless communication by a base station. The set of instructions, when executed by one or more processors of the base station, may cause the base station to transmit signaling identifying a plurality of power control configurations. The set of instructions, when executed by one or more processors of the base station, may cause the base station to receive uplink traffic transmitted using a power control configuration, of the plurality of power control configurations, associated with a channel type.

Some aspects described herein relate to a non-transitory computer-readable medium that stores a set of instructions for wireless communication by a base station. The set of instructions, when executed by one or more processors of the base station, may cause the base station to transmit, to a UE information configuring a set of resources associated with a set of pathloss reference signals. The set of instructions, when executed by one or more processors of the base station, may cause the base station to configure a pathloss reference signal, of the set of pathloss reference signals, for the UE based at least in part on a UE capability. The set of instructions, when executed by one or more processors of the base station, may cause the base station to communicate with the UE based at least in part on configuring the pathloss reference signal.

Some aspects described herein relate to an apparatus for wireless communication. The apparatus may include means for receiving signaling identifying a plurality of power control configurations, where each power control configuration, of the plurality of power control configurations, includes one or more power control parameters. The apparatus may include means for transmitting uplink traffic using a power control configuration, of the plurality of power control configurations, selected based at least in part on a channel type.

Some aspects described herein relate to an apparatus for wireless communication. The apparatus may include means for receiving, from a base station, information configuring a set of resources associated with a set of pathloss reference signals. The apparatus may include means for identifying a pathloss reference signal, of the set of pathloss reference signals, based at least in part on a UE capability. The apparatus may include means for communicating with the base station based at least in part on identifying the pathloss reference signal.

Some aspects described herein relate to an apparatus for wireless communication. The apparatus may include means for transmitting signaling identifying a plurality of power control configurations, where each power control configuration, of the plurality of power control configurations, includes one or more power control parameters. The apparatus may include means for receiving uplink traffic transmitted using a power control configuration, of the plurality of power control configurations, associated with a channel type.

Some aspects described herein relate to an apparatus for wireless communication. The apparatus may include means for transmitting, to a UE information configuring a set of resources associated with a set of pathloss reference signals. The apparatus may include means for configuring a pathloss reference signal, of the set of pathloss reference signals, for the UE based at least in part on a UE capability. The apparatus may include means for communicating with the UE based at least in part on configuring the pathloss reference signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
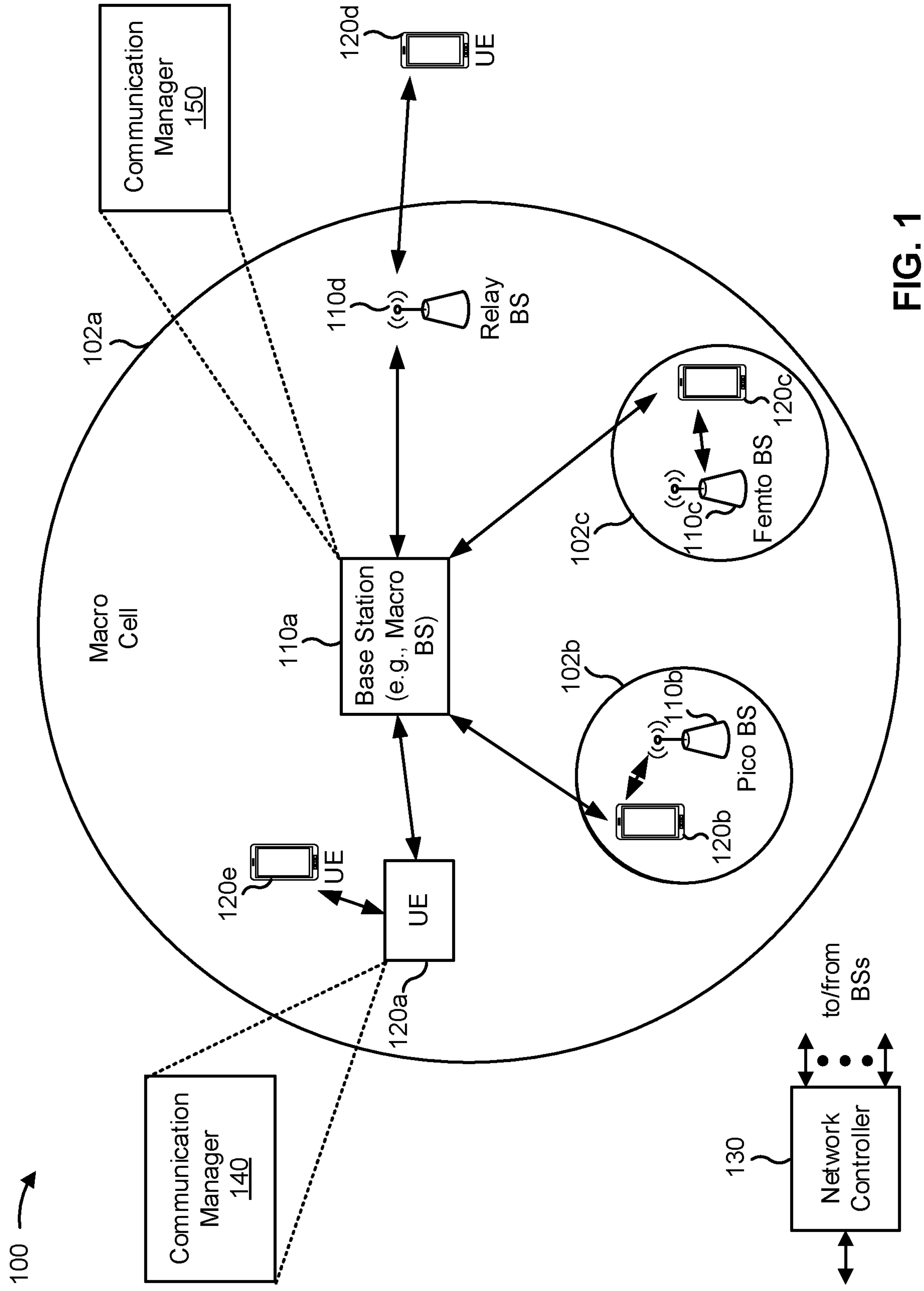
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive signaling identifying a plurality of power control configurations, wherein each power control configuration, of the plurality of power control configurations, includes one or more power control parameters; and transmit uplink traffic using a power control configuration, of the plurality of power control configurations, selected based at least in part on a channel type. The communication manager 140 may receive, from a base station, information configuring a set of resources associated with a set of pathloss reference signals; identify a pathloss reference signal, of the set of pathloss reference signals, based at least in part on a UE capability; and communicate with the base station based at least in part on identifying the pathloss reference signal. Additionally, or alternatively, the communication manager 140 may perform one or more other operations described herein.

In some aspects, the base station 110 may include a communication manager 150. As described in more detail elsewhere herein, the communication manager 150 may transmit signaling identifying a plurality of power control configurations, wherein each power control configuration, of the plurality of power control configurations, includes one or more power control parameters; and receive uplink traffic transmitted using a power control configuration, of the plurality of power control configurations, associated with a channel type. The communication manager 150 may transmit, to a UE, information configuring a set of resources associated with a set of pathloss reference signals; configure a pathloss reference signal, of the set of pathloss reference signals, for the UE based at least in part on a UE capability; and communicate with the UE based at least in part on configuring the pathloss reference signal. Additionally, or alternatively, the communication manager 150 may perform one or more other operations described herein.

As indicated above, FIG. 1 is provided as an example. Other examples may differ from what is described with regard to FIG. 1.

Figure 2:
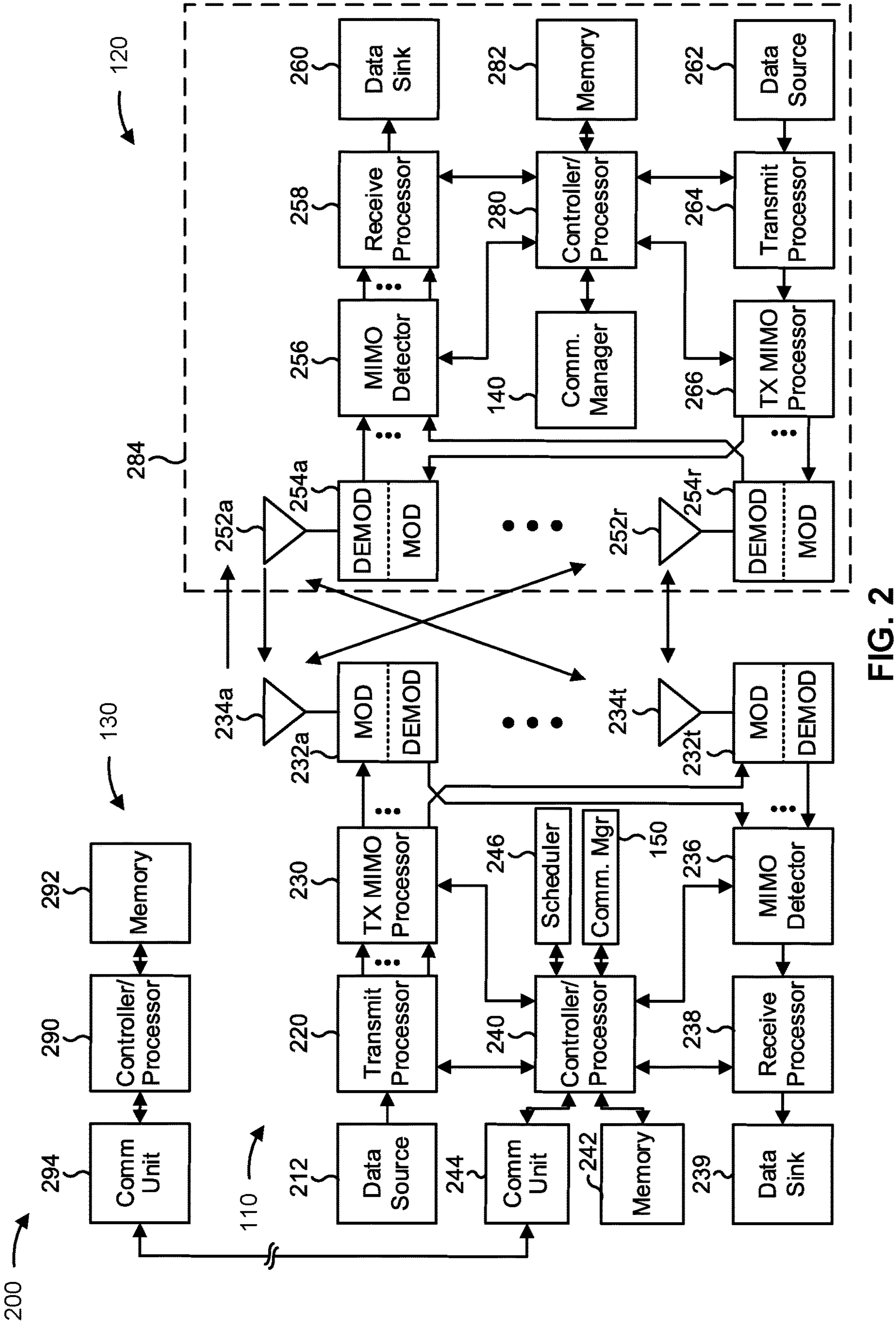
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with power control configuration, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving signaling identifying a plurality of power control configurations, wherein each power control configuration, of the plurality of power control configurations, includes one or more power control parameters; and/or means for transmitting uplink traffic using a power control configuration, of the plurality of power control configurations, selected based at least in part on a channel type. In some aspects, the UE 120 includes means for receiving, from a base station, information configuring a set of resources associated with a set of pathloss reference signals; means for identifying a pathloss reference signal, of the set of pathloss reference signals, based at least in part on a UE capability; and/or means for communicating with the base station based at least in part on identifying the pathloss reference signal. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting signaling identifying a plurality of power control configurations, wherein each power control configuration, of the plurality of power control configurations, includes one or more power control parameters; and/or means for receiving uplink traffic transmitted using a power control configuration, of the plurality of power control configurations, associated with a channel type. In some aspects, the base station 110 includes means for transmitting, to a UE, information configuring a set of resources associated with a set of pathloss reference signals; means for configuring a pathloss reference signal, of the set of pathloss reference signals, for the UE based at least in part on a UE capability; and/or means for communicating with the UE based at least in part on configuring the pathloss reference signal. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
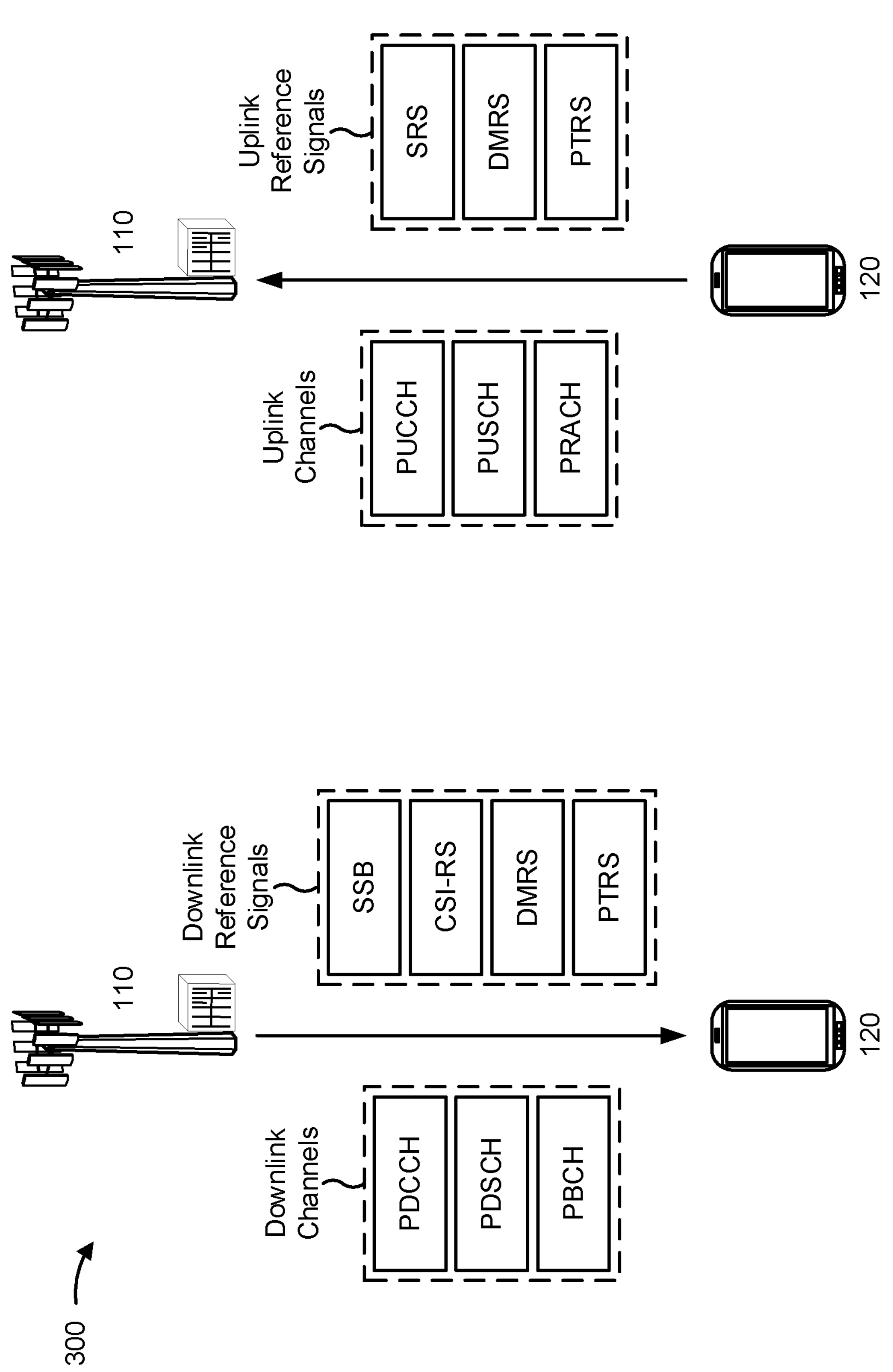
FIG. 3 is a diagram illustrating an example of physical channels and reference signals in a wireless network, in accordance with the present disclosure.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. The UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. The base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs.

Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. The base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

Some reference signals may be used as pathloss reference signals (PL-RSs). For example, a base station may transmit a reference signal with a fixed power value and may transmit information identifying the power of the reference signal that the base station is transmitting. The UE may decode the reference signal and measure a power of the reference signal. In this case, the UE may determine a path loss between the UE and the base station based at least in part on the transmit power of the reference signal and the measured received power of the reference signal. Using the path loss and information identifying a maximum allowable transmit power, the UE may determine a transmit power that the UE can use to avoid exceeding the maximum allowable transmit power in the presence of the path loss between the UE and the base station. This procedure may be termed an "open loop power control process." Other power control processes may be possible, such as a closed loop power control process (e.g., in which a feedback loop is used to determine a transmit power).

As indicated above, FIG. 3 is provided as an example. Other examples may differ from what is described with regard to FIG. 3.

Figure 4:
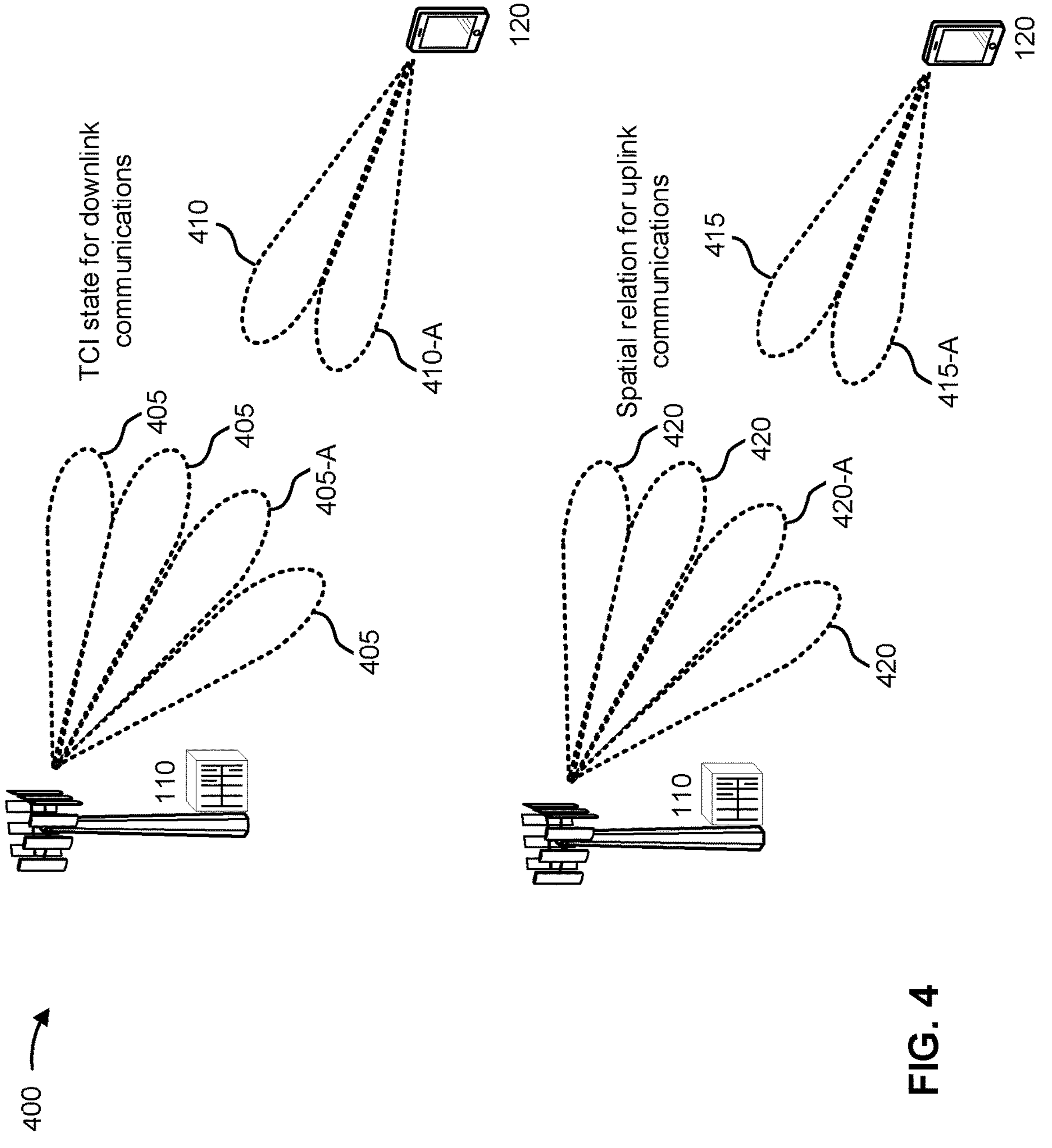
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 405.

The UE 120 may attempt to receive downlink transmissions via one or more UE receive beams 410, which may be configured using different beamforming parameters at receive circuitry of the UE 120. The UE 120 may identify a particular BS transmit beam 405, shown as BS transmit beam 405-A, and a particular UE receive beam 410, shown as UE receive beam 410-A, that provide relatively favorable performance (for example, that have a best channel quality of the different measured combinations of BS transmit beams 405 and UE receive beams 410). In some examples, the UE 120 may transmit an indication of which BS transmit beam 405 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 405-A and the UE receive beam 410-A), which may be further refined and maintained in accordance with one or more established beam refinement procedures.

A downlink beam, such as a BS transmit beam 405 or a UE receive beam 410, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 405 may be associated with an SSB, and the UE 120 may indicate a preferred BS transmit beam 405 by transmitting uplink transmissions in resources of the SSB that are associated with the preferred BS transmit beam 405. A particular SSB may have an associated TCI state (for example, for an antenna port or for beamforming). The base station 110 may, in some examples, indicate a downlink BS transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a BS transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 415.

Some networks may use different beam indication types for indicating one or more beams to use for communication via a set of channels. Beam indication types may include a beam indication that indicates to use a common beam for multiple channels and/or resources for reference signals, and/or beam indication types that include a single beam indication that indicates to use a beam for a single channel or a resource for reference signals.

In a unified TCI framework, a beam indication type 1 may indicate a joint uplink/downlink TCI state to indicate a common beam for at least one downlink channel and/or resource for downlink reference signals and for at least one uplink channel or resource for uplink reference signals. A beam indication type 2 may indicate a separate downlink common TCI state to indicate a common beam for at least two downlink channels or resources for downlink reference signals. A beam indication type 3 may indicate a separate uplink common TCI state to indicate a common beam for at least two uplink channels or resources for uplink reference signals. A beam indication type 4 may indicate a single TCI state to indicate a single beam for a single downlink channel or resource for downlink reference signals. A beam indication type 5 may indicate a single TCI state to indicate a single beam for a single uplink channel or resource for uplink reference signals. A beam indication type 6 may indicate a single uplink spatial relation to indicate a single beam for a single uplink channel or resource for uplink reference signals. TCI states, such as the TCI states described above, may be updated using DCI or medium access control (MAC) control element (CE) (MAC-CE) signaling.

Under the unified TCI state framework, different options may be possible for signaling power control configuration. For example, in a first option, a base station may signal a power control configuration on a per uplink channel/per reference signal object basis (e.g., regardless of which TCI state is applied to the uplink channel or reference signal object). In this case, signaled power control parameters may correspond to the uplink channel/reference signal object and may be invariant to the applied TCI state. In a second option, the base station may signal a power control configuration on a per TCI state basis (e.g., regardless of to which uplink channel or reference signal object the TCI state applies). In this case, signaled power control parameters may correspond to the applied TCI state and may be invariant to a type of uplink channel or reference signal object to which the TCI state is applied. In a third option, the base station may signal a power control configuration on a per uplink channel/reference signal object and per TCI state basis. In this case, the signaled power control parameters depend on both the applied TCI state and the uplink channel/reference signal object. The options for power control configuration may be non-exclusive, such that, for example, the first option and the third option may be deployed.

The base station 110 may receive uplink transmissions via one or more BS receive beams 420. The base station 110 may identify a particular UE transmit beam 415, shown as UE transmit beam 415-A, and a particular BS receive beam 420, shown as BS receive beam 420-A, that provide relatively favorable performance (for example, that have a best channel quality of the different measured combinations of UE transmit beams 415 and BS receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the BS receive beam 420-A), which may be further refined and maintained in accordance with one or more established beam refinement procedures. An uplink beam, such as a UE transmit beam 415 or a BS receive beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

As described above, a UE may determine an uplink power based at least in part on a pathloss estimation. For example, the UE may use information identifying a transmit power for a PL-RS and a measurement of a received power of the reference signal to identify a path loss for a path between the UE and a base station. Examples of pathloss reference signals that the UE and the base station may use include an SSB and a CSI-RS. Using the pathloss estimation and a set of power control parameters, the UE may determine a transmit power with which to transmit without exceeding a configured maximum transmit power. Examples of power control parameters include a PO parameter, an alpha parameter, or a closed loop index parameter, among other examples.

A base station may indicate a beamforming channel and associated beam using a TCI state or spatial relationship. Different beamforming channels may have different path losses, which may result in the UE using different PL-RSs for different TCI states. However, a maximum quantity of PL-RSs with which the UE may be configured is less than a maximum quantity of TCI states or spatial relationships. For example, for a UE with a particular UE capability, the UE may be configured to support up to 64 spatial relationships and 64 candidate beams, but may be configured with only up to 4 PL-RSs. Accordingly, not all of the uplink beams may have an associated PL-RS, which may result in a misalignment between a spatial beam (e.g., the beam that a TCI state indicates the UE is to use for uplink transmission) and a PL-RS beam (e.g., the beam for which the UE has a configured PL-RS). When the UE is configured with a different spatial beam from the PL-RS beams that the UE can use, such a misalignment may be termed a "a beam misalignment state."

As described above, different options for power control configuration may include configuring power control parameters per uplink channel/reference signal object, per TCI state, or both per uplink channel/reference signal object and per TCI state. Accordingly, a UE may have a static power control configuration with a static set of power control parameters that may be signaled. However, different channels, traffic types, or priorities may have different conditions with respect to path loss and associated power control. Moreover, beam misalignment may result in issues with measuring path loss and associated power control that some UEs may lack a capability for resolving. Incorrect power control as a result of a static power control configuration or a beam misalignment that the UE is not capable of handling may result in incorrect transmit power determinations and poor communication performance.

Some aspects described herein enable power control configuration. For example, a UE may receive signaling identifying a plurality of power control configurations with each power control configuration including one or more power control parameters and corresponding to a channel type, a traffic type, and/or a traffic priority. In this case, the UE may select a power control configuration and associated power control parameters based at least in part on a channel type, traffic type, and/or traffic priority of uplink traffic that the UE is to transmit. The traffic type, and/or traffic priority of uplink traffic may be indicated to UE in the same signaling that schedules the uplink traffic. Additionally, or alternatively, a UE may optionally report a capability for handling a beam misalignment state, and a base station may configure a PL-RS for the UE in accordance with a UE report of the capability for handling the beam misalignment state and/or a rule for handling when the UE does not transmit a UE report of the capability for handling the beam misalignment state. In this way, the base station and the UE may ensure an accurate transmit power determination and power control, thereby improving communication performance relative to other techniques for power control.

Figure 5:
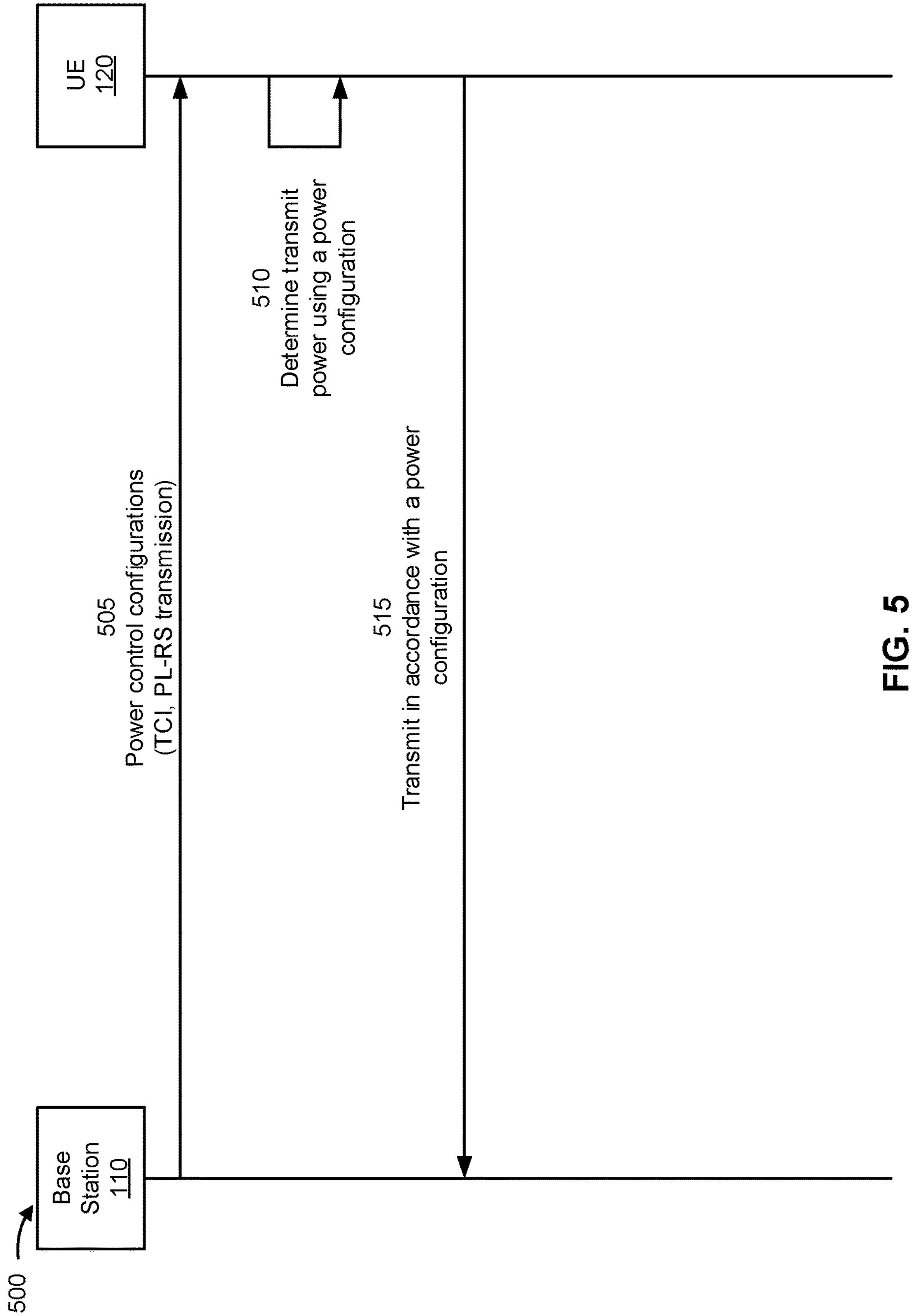
FIG. 5 is a diagram illustrating an example associated with power control parameter configuration, in accordance with the present disclosure.

FIG. 5 is a diagram illustrating an example 500 associated with power control parameter configuration, in accordance with the resent disclosure. As shown in FIG. 5, example 500 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 5, and by reference number 505, UE 120 may receive signaling identifying a plurality of power control configurations. For example, base station 110 may transmit the signaling to UE 120 to identify the plurality of power control configurations that UE 120 can use to determine a transmit power for uplink traffic. In some aspects, UE 120 may receive information identifying a TCI state and/or a PL-RS in connection with receiving the information identifying the plurality of power control configurations. For example, UE 120 may receive a plurality of communications to identify the plurality of power control configurations, to identify the TCI state, and to receive and measure the PL-RS. Additionally, or alternatively, UE 120 may receive information identifying the plurality of power control configurations and the TCI state in a single communication.

In some aspects, UE 120 may receive signaling configuring the plurality of power control configurations using a particular signaling path, such as via RRC signaling, MAC-CE signaling, or DCI signaling (e.g., which may convey information identifying a physical priority of a scheduled uplink channel). In some aspects, UE 120 may transmit a UE capability indicator to identify a UE capability associated with power control configuration. For example, UE 120 may indicate a UE capability, and base station 110 may configure a plurality of power control parameters (e.g., on a per channel or per channel/TCI state basis) for UE 120 based at least in part on the UE capability.

In some aspects, UE 120 may receive information identifying power control configurations corresponding to different types of uplink channels for transmitting uplink traffic. For example, UE 120 may receive information identifying power control configurations corresponding to PRACH communications, PUCCH communications, PUSCH communications, or SRS communications, among other examples. Additionally, or alternatively, UE 120 may receive information identifying power control configurations for different types of uplink traffic associated with different services. For example, UE 120 may receive information identifying power control configurations to use for enhanced mobile broadband (eMBB) traffic or ultra-reliable low-latency communication (URLLC) traffic, among other examples. Additionally, or alternatively, UE 120 may receive information identifying power control configurations for different priorities of traffic. For example, UE 120 may receive information identifying different power control configurations for high priority traffic and low priority traffic (e.g., or any other prioritization of traffic).

In some aspects, UE 120 may receive a power control configuration with a set of power control parameters configured for a particular TCI state. For example, when power control parameters are to be configured per TCI state, per channel, each TCI state may be associated with a plurality of power control parameter set lists per channel, with each power control parameter set list including a plurality of different power control parameter sets for a plurality of different traffic types or priorities. In this case, based at least in part on an indicated TCI state, an indicated channel, and/or an indicated traffic type or priority, UE 120 may identify a particular set of power control parameters to use for transmit power determination. In some aspects, UE 120 may receive, from base station 110, an RRC information element (IE) of a TCI state or associated with a TCI state identifier and linked to a TCI state. The RRC IE may include information identifying the plurality of power control parameter set lists.

In some aspects, when power control parameters are to be configured per uplink channel/reference signal object ("per channel object"), UE 120 may receive information identifying different parameter sets for each channel type with each parameter set corresponding to a traffic type or priority that can be transmitted within the corresponding channel type. Additionally, or alternatively, UE 120 may receive information identifying different parameter sets for each resource set, with each parameter set corresponding to a traffic type or priority that can be transmitted within the corresponding resource set. For example, each SRS resource set or PUCCH resource set may be configured with different power control parameter sets. Additionally, or alternatively, UE 120 may receive information identifying different parameter sets for each transmission scheme (e.g., for PUSCH communications, parameter sets for codebook-based transmission or non-codebook based transmission).

As further shown in FIG. 5, and by reference number 510, UE 120 may determine a transmit power for uplink traffic. For example, UE 120 may determine a pathloss estimation and, using the pathloss estimation and a set of power control parameters of a selected power control configuration, UE 120 may determine the transmit power for the uplink traffic. In some aspects, UE 120 may identify an uplink channel, an uplink traffic type, an uplink priority, or a TCI state associated with the uplink traffic to determine the transmit power. For example, UE 120 may determine that the uplink traffic is associated with a particular channel and a particular traffic type and may select a power control configuration, of a plurality of power control configurations for a plurality of different channel types, associated with the particular channel and may select a set of power control parameters of a list of sets of power control parameters for the power control configuration. In this case, UE 120 may use the selected set of power control parameters to determine the uplink transmit power.

As further shown in FIG. 5, and by reference number 515, UE 120 may transmit in accordance with the selected power control configuration. For example, based at least in part on determining a transmit power using the selected power control configuration, UE 120 may transmit on an uplink using the determined transmit power.

As indicated above, FIG. 5 is provided as an example. Other examples may differ from what is described with respect to FIG. 5.

Figure 6:
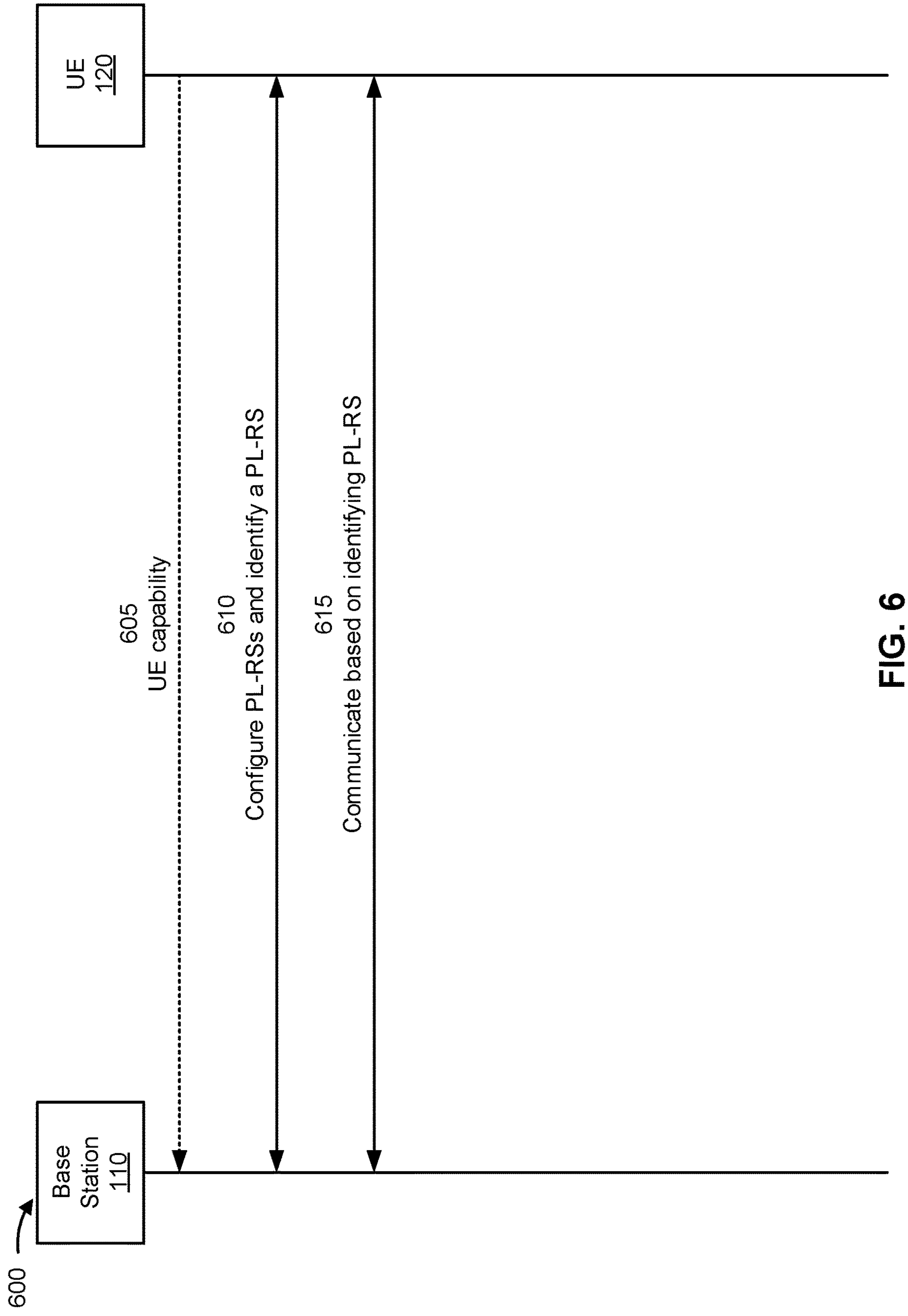
FIG. 6 is a diagram illustrating an example associated with pathloss reference signal configuration, in accordance with the present disclosure.

FIG. 6 is a diagram illustrating an example 600 associated with PL-RS configuration, in accordance with the present disclosure. As shown in FIG. 6, example 600 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 6, and by reference number 605, UE 120 may transmit a report of a UE capability relating to a beam misalignment state. For example, UE 120 may report support for beam misalignment, in which case, base station 110 may configure PL-RSs and allow for misalignment between the PL-RSs and beams associated with indicated TCI states. Additionally, or alternatively, UE 120 may report that UE 120 does not support beam misalignment. In this case, base station 110 may configure PL-RSs to avoid beam misalignment with an indicated TCI state. Additionally, or alternatively, UE 120 may forgo reporting a UE capability. In this case, base station 110 may follow a default rule for evaluating whether UE 120 supports beam misalignment (e.g., base station 110 may determine that, by default, UE 120 supports beam misalignment).

As described above, beam misalignment state may occur when an uplink spatial beam is different from the PL-RS beam, resulting in a beam misalignment between the PL-RS and an uplink spatial filter for the uplink spatial beam. In contrast, a beam alignment may occur when the PL-RS is the same beam as a spatial relation RS (e.g., a source RS for quasi-co-location (QCL) type-D) in an uplink or joint TCI state. Additionally, or alternatively, beam alignment may occur when the spatial relation RS is a direct or indirect QCL source of a PL-RS, or when the PL-RS is a direct or indirect QCL source of the spatial relation RS. Additionally, or alternatively, beam alignment may occur when the PL-RS and the spatial relation RS share a common QCL source (e.g., a common SSB). In some aspects, base station 110 may indicate a QCL relationship in a pre-configuration message. For example, base station 110 may indicate two RSs (e.g., two SSBs of the same index on two component carriers (CCs)) that are quasi-co-located and subject to the same TCI updates. In some aspects, base station 110 may not indicate a PL-RS for each TCI state. For example, base station 110 may indicate a PL-RS for a first set of TCI states and forgo indicating a PL-RS for a second set of TCI states, in this case, base station 110 and UE 120 may apply a default PL-RS to a TCI state (e.g., a PL-RS from a PL-RS list with a lowest index may be applied as a default PL-RS).

As further shown in FIG. 6, and by reference number 610, UE 120 and base station 110 may communicate to configure PL-RSs and identify a PL-RS for UE 120 to use for transmit power determination. For example, when UE 120 supports beam misalignment, base station 110 may configure PL-RSs and UE 120 may identify a default PL-RS from a configured PL-RS list when a PL-RS is not specified for a TCI state, as described above. In contrast, when UE 120 does not support beam misalignment and a TCI state is not configured with a PL-RS, UE 120 may identify a PL-RS based at least in part on a source RS of the TCI state. For example, UE 120 may use the source RS or the SSB source of the TCI state to identify the PL-RS.

As further shown in FIG. 6, and by reference number 615, based at least in part on identifying the PL-RS, UE 120 may communicate with base station 110. For example, UE 120 may receive the PL-RS, estimate a pathloss, determine a transmit power, and transmit uplink traffic based at least in part on identifying the PL-RS.

As indicated above, FIG. 6 is provided as an example. Other examples may differ from what is described with respect to FIG. 6.

Figure 7:
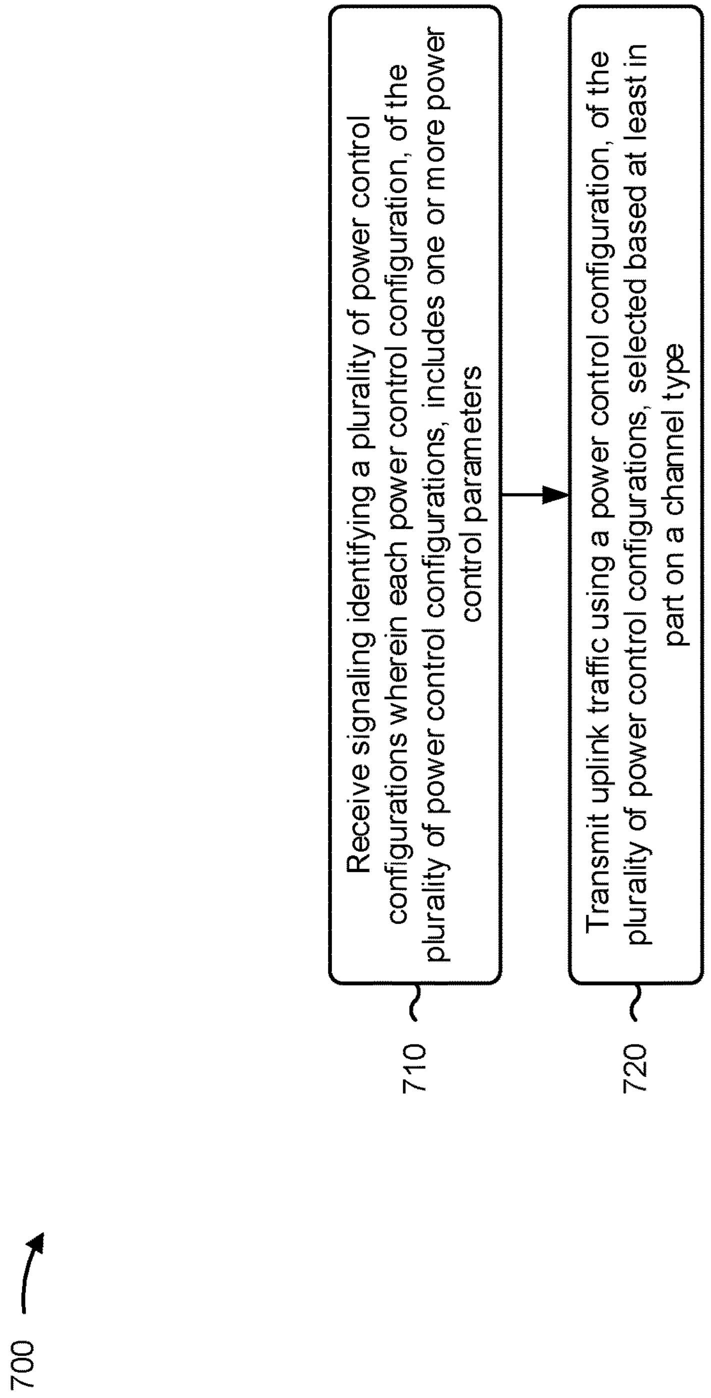
FIGS. 7-10 are diagrams illustrating example processes associated with power control configuration, in accordance with the present disclosure.

FIG. 7 is a diagram illustrating an example process 700 performed, for example, by a UE, in accordance with the present disclosure. Example process 700 is an example where the UE (e.g., UE 120) performs operations associated with power control configuration.

As shown in FIG. 7, in some aspects, process 700 may include receiving signaling identifying a plurality of power control configurations, wherein each power control configuration, of the plurality of power control configurations, includes one or more power control parameters (block 710). For example, the UE (e.g., using communication manager 140 and/or reception component 1102, depicted in FIG. 11) may receive signaling identifying a plurality of power control configurations, wherein each power control configuration, of the plurality of power control configurations, includes one or more power control parameters, as described above. In some aspects, each power control configuration, of the plurality of power control configurations, includes one or more power control parameters.

As further shown in FIG. 7, in some aspects, process 700 may include transmitting uplink traffic using a power control configuration, of the plurality of power control configurations, selected based at least in part on a channel type (block 720). For example, the UE (e.g., using communication manager 140 and/or transmission component 1104, depicted in FIG. 11) may transmit uplink traffic using a power control configuration, of the plurality of power control configurations, selected based at least in part on a channel type, as described above.

Process 700 may include additional aspects, such as any single aspect or any combination of aspects described below and/or in connection with one or more other processes described elsewhere herein.

In a first aspect, the power control configuration is selected based at least in part on a traffic type or a traffic priority.

In a second aspect, alone or in combination with the first aspect, the channel type is at least one of a physical random access channel, a physical uplink control channel, a physical uplink shared channel, or a sounding reference signal.

In a third aspect, alone or in combination with one or more of the first and second aspects, power control configurations, of the plurality of power control configurations, differ with respect to at least one of a power control parameter, or a pathloss reference signal.

In a fourth aspect, alone or in combination with one or more of the first through third aspects, the signaling includes one of radio resource control signaling, a medium access control (MAC) control element (CE) (MAC-CE), or downlink control information.

In a fifth aspect, alone or in combination with one or more of the first through fourth aspects, process 700 includes selecting the power control configuration from the plurality of power control configurations based at least in part on a received indication or a static rule.

In a sixth aspect, alone or in combination with one or more of the first through fifth aspects, the power control configuration includes one or more power control parameters associated with a transmission configuration indicator state.

In a seventh aspect, alone or in combination with one or more of the first through sixth aspects, the transmission configuration indicator state is associated with one or more power control parameter set lists corresponding to one or more channel types, wherein a power control parameter set list, of the one or more power control parameter set lists, includes one or more power control parameter sets corresponding to one or more traffic types or priorities, and wherein the one or more power control parameters of the power control configuration are based at least in part on a power control parameter set of the one or more power control parameter sets.

In an eighth aspect, alone or in combination with one or more of the first through seventh aspects, information identifying the association between the transmission configuration indicator state and the one or more power control parameter set lists is received in connection with transmission configuration indicator state activation signaling.

In a ninth aspect, alone or in combination with one or more of the first through eighth aspects, the power control configuration includes one or more power control parameters associated with a channel object.

In a tenth aspect, alone or in combination with one or more of the first through ninth aspects, the power control configuration includes one or more power control parameter sets corresponding to one or more traffic types or priorities.

In an eleventh aspect, alone or in combination with one or more of the first through tenth aspects, the UE is configured with a plurality of resource sets or transmission types, wherein each resource set or transmission type, of the plurality of resource sets or transmission types, is associated with one or more power control parameter sets, wherein each power control parameter set corresponds to a traffic type or priority.

In a twelfth aspect, alone or in combination with one or more of the first through eleventh aspects, the power control configuration is based at least in part on a UE capability reported by the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
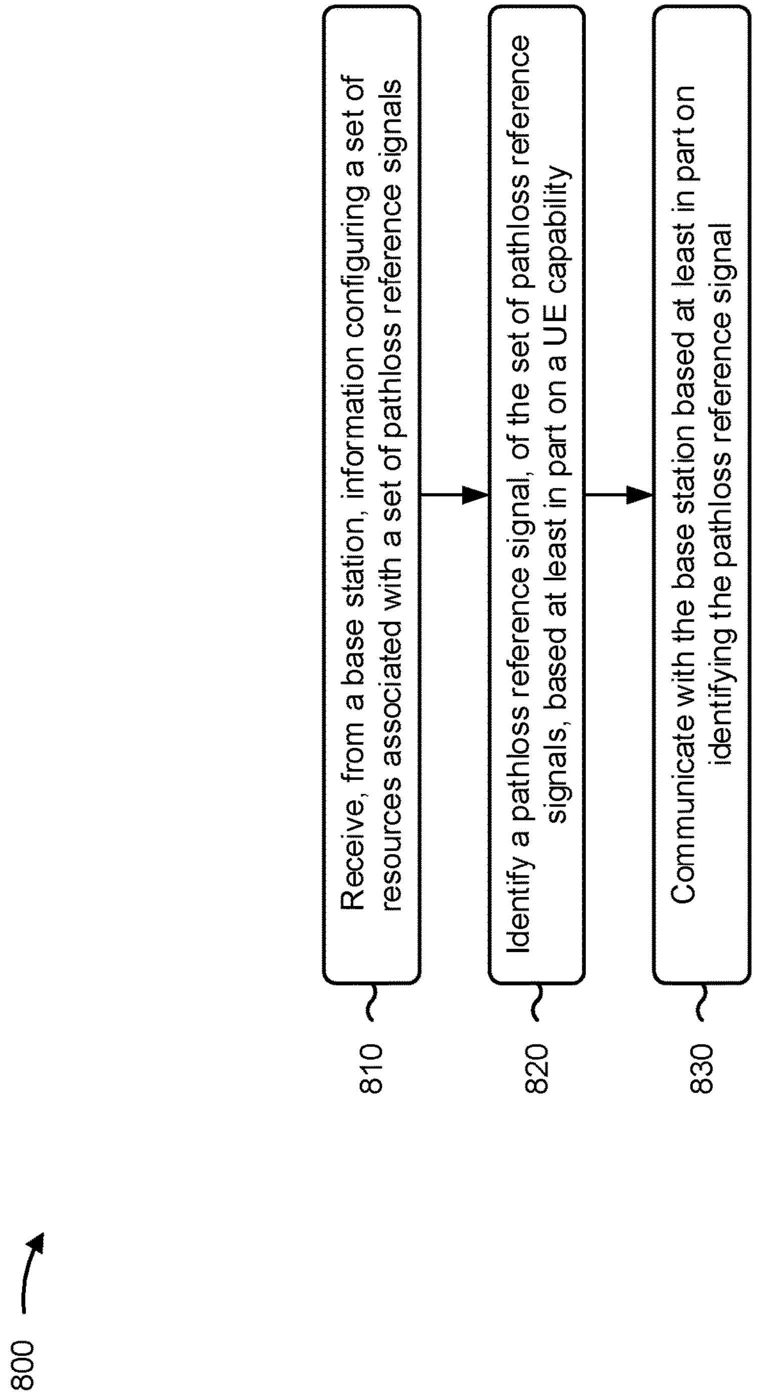

FIG. 8 is a diagram illustrating an example process 800 performed, for example, by a UE, in accordance with the present disclosure. Example process 800 is an example where the UE (e.g., UE 120) performs operations associated with power control configuration.

As shown in FIG. 8, in some aspects, process 800 may include receiving, from a base station, information configuring a set of resources associated with a set of pathloss reference signals (block 810). For example, the UE (e.g., using communication manager 140 and/or reception component 1102, depicted in FIG. 11) may receive, from a base station, information configuring a set of resources associated with a set of pathloss reference signals, as described above.

As further shown in FIG. 8, in some aspects, process 800 may include identifying a pathloss reference signal, of the set of pathloss reference signals, based at least in part on a UE capability (block 820). For example, the UE (e.g., using communication manager 140 and/or identification component 1108, depicted in FIG. 11) may identify a pathloss reference signal, of the set of pathloss reference signals, based at least in part on a UE capability, as described above.

As further shown in FIG. 8, in some aspects, process 800 may include communicating with the base station based at least in part on identifying the pathloss reference signal (block 830). For example, the UE (e.g., using communication manager 140 and/or reception component 1102 or transmission component 1104, depicted in FIG. 11) may communicate with the base station based at least in part on identifying the pathloss reference signal, as described above.

Process 800 may include additional aspects, such as any single aspect or any combination of aspects described below and/or in connection with one or more other processes described elsewhere herein.

In a first aspect, the pathloss reference signal is in a beam alignment state with an uplink beam of the UE based at least in part on satisfaction of a beam alignment condition, wherein the beam alignment condition is associated with at least one of whether the pathloss reference signal corresponds to a spatial relation reference signal in an uplink or joint transmission configuration indicator state, whether the pathloss reference signal corresponds to a source reference signal of a quasi-co-location type-D parameter, whether a spatial relation reference signal is a direct or indirect quasi-co-location source of the pathloss reference signal, whether the pathloss reference signal is a direct or indirect quasi-co-location source of a spatial relation reference signal, or whether the pathloss reference signal and a spatial relation reference signal share a common quasi-co-location source.

In a second aspect, alone or in combination with the first aspect, the pathloss reference signal is a default common pathloss reference signal for a transmission configuration state that is not individually configured with the pathloss reference signal.

In a third aspect, alone or in combination with one or more of the first and second aspects, the UE is configured to report a support for a beam misalignment state.

In a fourth aspect, alone or in combination with one or more of the first through third aspects, the UE is not configured to support a beam misalignment state, and the pathloss reference signal is configured to align to a spatial reference signal of a transmission configuration indicator state.

In a fifth aspect, alone or in combination with one or more of the first through fourth aspects, the UE does not report information identifying whether the UE supports a beam misalignment state, and wherein the pathloss reference signal is based at least in part on a default rule that the UE supports the beam misalignment state.

In a sixth aspect, alone or in combination with one or more of the first through fifth aspects, the UE is configured to support a beam misalignment state, and the pathloss reference signal is selected from a configured pathloss reference signal list based at least in part on a set of selection criteria.

In a seventh aspect, alone or in combination with one or more of the first through sixth aspects, the UE is not configured to support a beam misalignment state, and the pathloss reference signal is selected based at least in part on a source reference signal of a transmission configuration indicator state.

In an eighth aspect, alone or in combination with one or more of the first through seventh aspects, the pathloss reference signal is based at least in part on an identifier or a source reference signal of a transmission configuration state of the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
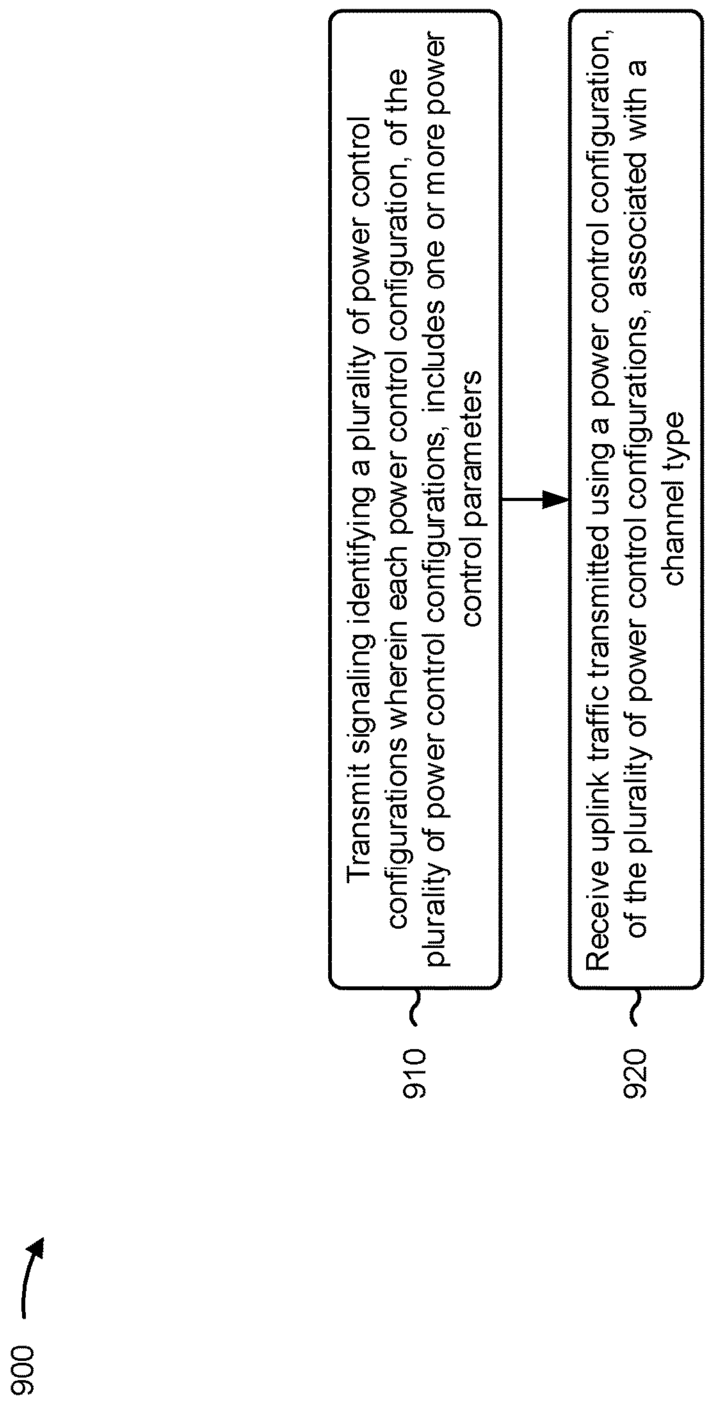

FIG. 9 is a diagram illustrating an example process 900 performed, for example, by a base station, in accordance with the present disclosure. Example process 900 is an example where the base station (e.g., base station 110) performs operations associated with power control configuration.

As shown in FIG. 9, in some aspects, process 900 may include transmitting signaling identifying a plurality of power control configurations, wherein each power control configuration, of the plurality of power control configurations, includes one or more power control parameters (block 910). For example, the base station (e.g., using communication manager 150 and/or transmission component 1204, depicted in FIG. 12) may transmit signaling identifying a plurality of power control configurations, wherein each power control configuration, of the plurality of power control configurations, includes one or more power control parameters, as described above. In some aspects, each power control configuration, of the plurality of power control configurations, includes one or more power control parameters.

As further shown in FIG. 9, in some aspects, process 900 may include receiving uplink traffic transmitted using a power control configuration, of the plurality of power control configurations, associated with a channel type (block 920). For example, the base station (e.g., using communication manager 150 and/or reception component 1202, depicted in FIG. 12) may receive uplink traffic transmitted using a power control configuration, of the plurality of power control configurations, associated with a channel type, as described above.

Process 900 may include additional aspects, such as any single aspect or any combination of aspects described below and/or in connection with one or more other processes described elsewhere herein.

In a first aspect, the power control configuration is associated with a traffic type or a traffic priority.

In a second aspect, alone or in combination with the first aspect, the channel type is at least one of a physical random access channel, a physical uplink control channel, a physical uplink shared channel, or a sounding reference signal.

In a third aspect, alone or in combination with one or more of the first and second aspects, power control configurations, of the plurality of power control configurations, differ with respect to at least one of a power control parameter, or a pathloss reference signal.

In a fourth aspect, alone or in combination with one or more of the first through third aspects, the signaling includes one of radio resource control signaling, a medium access control (MAC) control element (CE) (MAC-CE), or downlink control information.

In a fifth aspect, alone or in combination with one or more of the first through fourth aspects, the power control configuration is selected from the plurality of power control configurations based at least in part on a transmitted indication or a static rule.

In a sixth aspect, alone or in combination with one or more of the first through fifth aspects, the power control configuration includes one or more power control parameters associated with a transmission configuration indicator state.

In a seventh aspect, alone or in combination with one or more of the first through sixth aspects, the transmission configuration indicator state is associated with one or more power control parameter set lists corresponding to one or more channel types, wherein a power control parameter set list, of the one or more power control parameter set lists, includes one or more power control parameter sets corresponding to one or more traffic types or priorities, and wherein the one or more power control parameters of the power control configuration are based at least in part on a power control parameter set of the one or more power control parameter sets.

In an eighth aspect, alone or in combination with one or more of the first through seventh aspects, information identifying the association between the transmission configuration indicator state and the one or more power control parameter set lists is transmitted in connection with transmission configuration indicator state activation signaling.

In a ninth aspect, alone or in combination with one or more of the first through eighth aspects, the power control configuration includes one or more power control parameters associated with a channel object.

In a tenth aspect, alone or in combination with one or more of the first through ninth aspects, the power control configuration includes one or more power control parameter sets corresponding to one or more traffic types or priorities.

In an eleventh aspect, alone or in combination with one or more of the first through tenth aspects, process 900 includes configuring a UE with a plurality of resource sets or transmission types, wherein each resource set or transmission type, of the plurality of resource sets or transmission types, is associated with one or more power control parameter sets, wherein each power control parameter set corresponds to a traffic type or priority.

In a twelfth aspect, alone or in combination with one or more of the first through eleventh aspects, the power control configuration is based at least in part on a user equipment capability.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
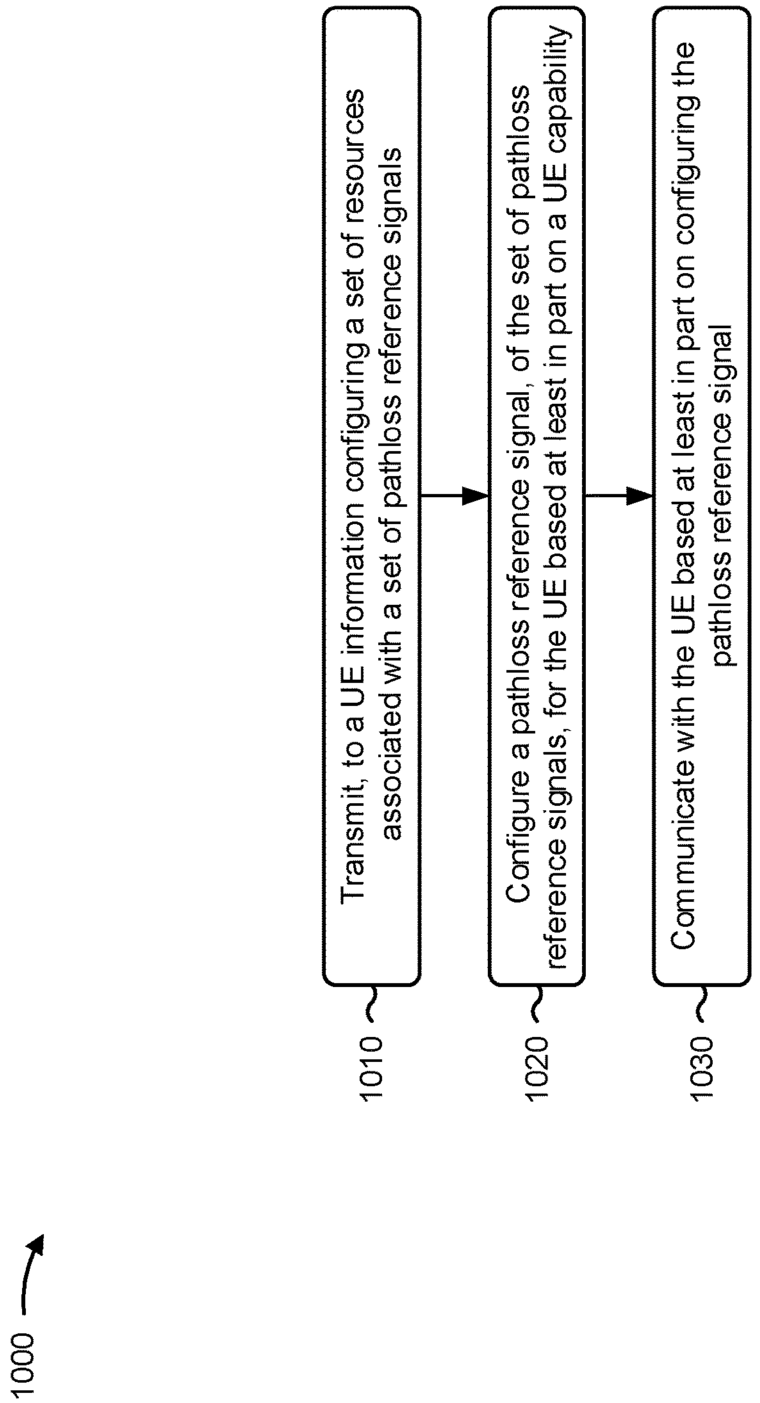

FIG. 10 is a diagram illustrating an example process 1000 performed, for example, by a base station, in accordance with the present disclosure. Example process 1000 is an example where the base station (e.g., base station 110) performs operations associated with power control configuration.

As shown in FIG. 10, in some aspects, process 1000 may include transmitting, to a UE information configuring a set of resources associated with a set of pathloss reference signals (block 1010). For example, the base station (e.g., using communication manager 150 and/or transmission component 1204, depicted in FIG. 12) may transmit, to a UE information configuring a set of resources associated with a set of pathloss reference signals, as described above.

As further shown in FIG. 10, in some aspects, process 1000 may include configuring a pathloss reference signal, of the set of pathloss reference signals, for the UE based at least in part on a UE capability (block 1020). For example, the base station (e.g., using communication manager 150 and/or configuration component 1208, depicted in FIG. 12) may configure a pathloss reference signal, of the set of pathloss reference signals, for the UE based at least in part on a UE capability, as described above.

As further shown in FIG. 10, in some aspects, process 1000 may include communicating with the UE based at least in part on configuring the pathloss reference signal (block 1030). For example, the base station (e.g., using communication manager 150 and/or reception component 1202 or transmission component 1204, depicted in FIG. 12) may communicate with the UE based at least in part on configuring the pathloss reference signal, as described above.

Process 1000 may include additional aspects, such as any single aspect or any combination of aspects described below and/or in connection with one or more other processes described elsewhere herein.

In a first aspect, the pathloss reference signal is in a beam alignment state with an uplink beam of the UE based at least in part on satisfaction of a beam alignment condition, wherein the beam alignment condition is associated with at least one of whether the pathloss reference signal corresponds to a spatial relation reference signal in an uplink or joint transmission configuration indicator state, whether the pathloss reference signal corresponds to a source reference signal of a quasi-co-location type-D parameter, whether a spatial relation reference signal is a direct or indirect quasi-co-location source of the pathloss reference signal, whether the pathloss reference signal is a direct or indirect quasi-co-location source of a spatial relation reference signal, or whether the pathloss reference signal and a spatial relation reference signal share a common quasi-co-location source.

In a second aspect, alone or in combination with the first aspect, the pathloss reference signal is a default common pathloss reference signal for a transmission configuration state that is not individually configured with the pathloss reference signal.

In a third aspect, alone or in combination with one or more of the first and second aspects, process 1000 includes receiving, from the UE, reporting indicating support for a beam misalignment state.

In a fourth aspect, alone or in combination with one or more of the first through third aspects, the UE is not configured to support a beam misalignment state, and the pathloss reference signal is configured to align to a spatial reference signal of a transmission configuration indicator state.

In a fifth aspect, alone or in combination with one or more of the first through fourth aspects, the UE does not report information identifying whether the UE supports a beam misalignment state, and wherein the pathloss reference signal is based at least in part on a default rule that the UE supports the beam misalignment state.

In a sixth aspect, alone or in combination with one or more of the first through fifth aspects, the UE is configured to support a beam misalignment state, and the pathloss reference signal is selected from a configured pathloss reference signal list based at least in part on a set of selection criteria.

In a seventh aspect, alone or in combination with one or more of the first through sixth aspects, the UE is not configured to support a beam misalignment state, and the pathloss reference signal is selected based at least in part on a source reference signal of a transmission configuration indicator state.

In an eighth aspect, alone or in combination with one or more of the first through seventh aspects, the pathloss reference signal is based at least in part on an identifier or a source reference signal of a transmission configuration state of the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
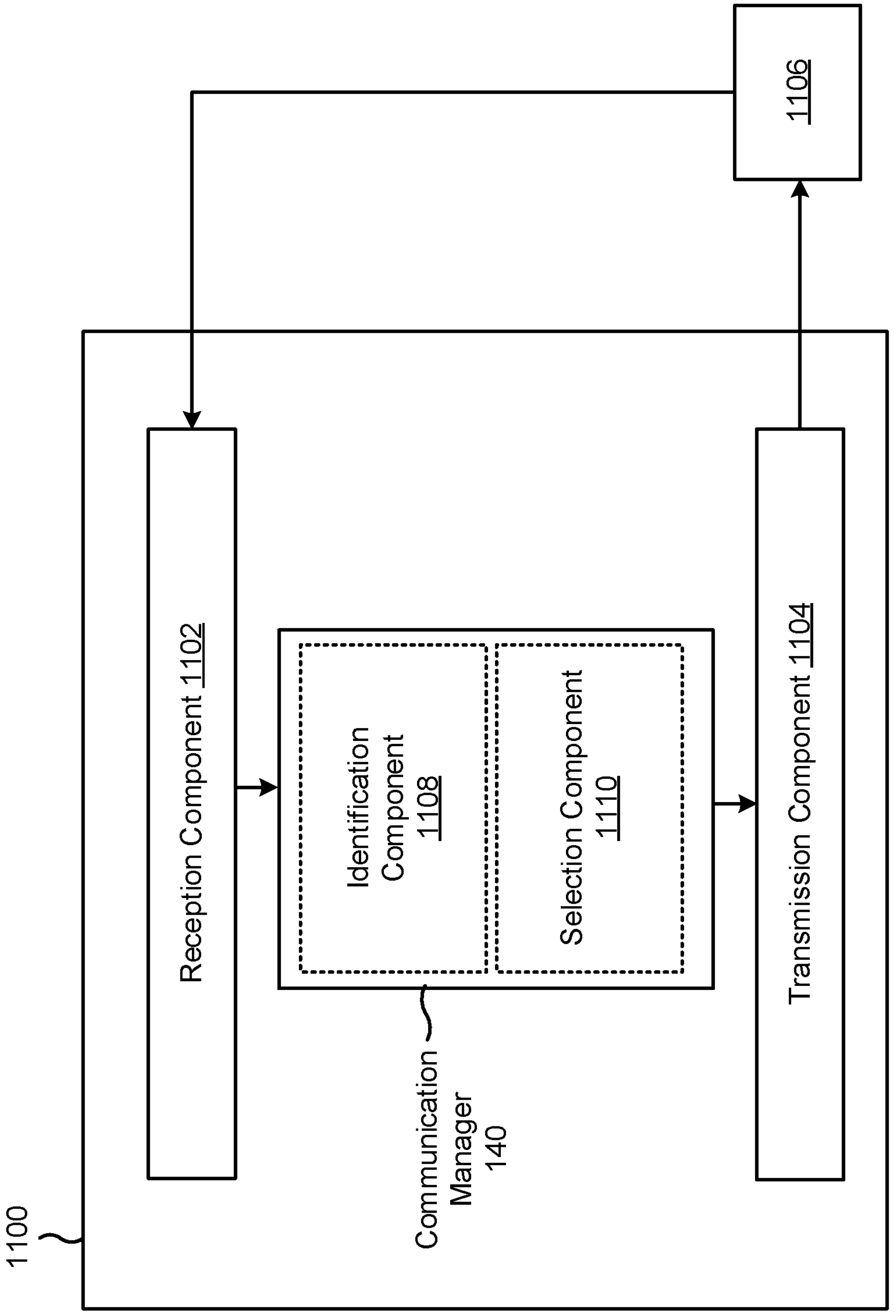
FIGS. 11-12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an identification component 1108 or a selection component 1110, among other examples.

In some aspects, the apparatus 1100 may be configured to perform one or more operations described herein in connection with FIGS. 5-6. Additionally, or alternatively, the apparatus 1100 may be configured to perform one or more processes described herein, such as process 700 of FIG. 7, process 800 of FIG. 8, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive signaling identifying a plurality of power control configurations wherein each power control configuration, of the plurality of power control configurations, includes one or more power control parameters. The transmission component 1104 may transmit uplink traffic using a power control configuration, of the plurality of power control configurations, selected based at least in part on a channel type.

The selection component 1110 may select the power control configuration from the plurality of power control configurations based at least in part on a received indication or a static rule.

The reception component 1102 may receive, from abase station, information configuring a set of resources associated with a set of pathloss reference signals. The identification component 1108 may identify a pathloss reference signal, of the set of pathloss reference signals, based at least in part on a UE capability. The reception component 1102 and/or the transmission component 1104 may communicate with the base station based at least in part on identifying the pathloss reference signal.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
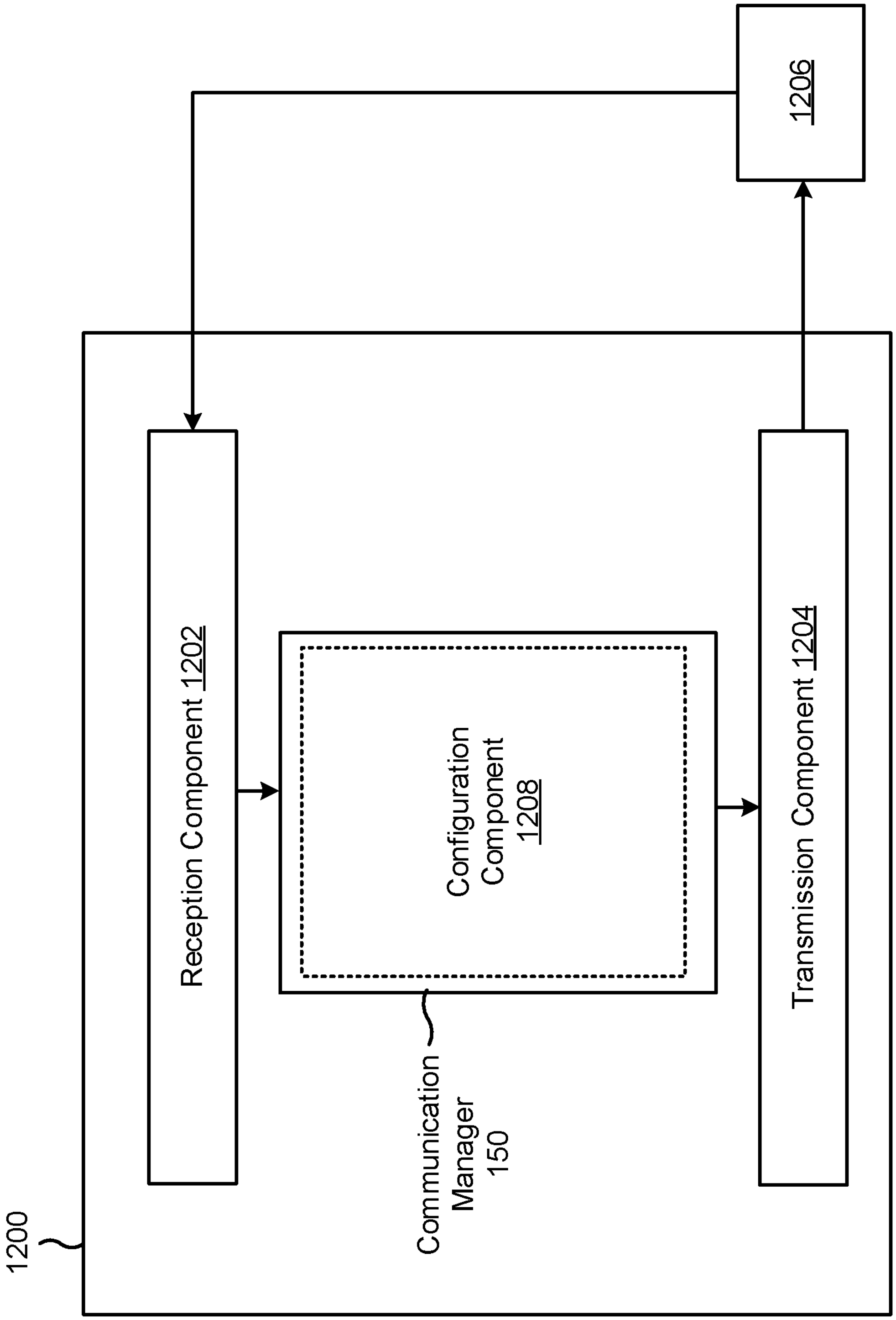

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a configuration component 1208, among other examples.

In some aspects, the apparatus 1200 may be configured to perform one or more operations described herein in connection with FIGS. 5-6. Additionally, or alternatively, the apparatus 1200 may be configured to perform one or more processes described herein, such as process 900 of FIG. 9, process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit signaling identifying a plurality of power control configurations wherein each power control configuration, of the plurality of power control configurations, includes one or more power control parameters. The reception component 1202 may receive uplink traffic transmitted using a power control configuration, of the plurality of power control configurations, associated with a channel type. The configuration component 1208 may configure a UE with a plurality of resource sets or transmission types, wherein each resource set or transmission type, of the plurality of resource sets or transmission types, is associated with one or more power control parameter sets wherein each power control parameter set corresponds to a traffic type or priority.

The transmission component 1204 may transmit, to a UE information configuring a set of resources associated with a set of pathloss reference signals. The configuration component 1208 may configure a pathloss reference signal, of the set of pathloss reference signals, for the UE based at least in part on a UE capability. The reception component 1202 or the transmission component 1204 may communicate with the UE based at least in part on configuring the pathloss reference signal. The reception component 1202 may receive, from the UE, reporting indicating support for a beam misalignment state.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving signaling identifying a plurality of power control configurations, wherein each power control configuration, of the plurality of power control configurations, includes one or more power control parameters; and transmitting uplink traffic using a power control configuration, of the plurality of power control configurations, selected based at least in part on a channel type.

Aspect 2: The method of Aspect 1, wherein the power control configuration is selected based at least in part on a traffic type or a traffic priority.

Aspect 3: The method of any of Aspects 1 to 2, wherein the channel type is at least one of: a physical random access channel, a physical uplink control channel, a physical uplink shared channel, or a sounding reference signal.

Aspect 4: The method of any of Aspects 1 to 3, wherein power control configurations, of the plurality of power control configurations, differ with respect to at least one of: a power control parameter, or a pathloss reference signal.

Aspect 5: The method of any of Aspects 1 to 4, wherein the signaling includes one of radio resource control signaling, a medium access control (MAC) control element (CE) (MAC-CE), or downlink control information.

Aspect 6: The method of any of Aspects 1 to 5, further comprising: selecting the power control configuration from the plurality of power control configurations based at least in part on a received indication or a static rule.

Aspect 7: The method of any of Aspects 1 to 6, wherein the power control configuration includes one or more power control parameters associated with a transmission configuration indicator state.

Aspect 8: The method of Aspect 7, wherein the transmission configuration indicator state is associated with one or more power control parameter set lists corresponding to one or more channel types, wherein a power control parameter set list, of the one or more power control parameter set lists, includes one or more power control parameter sets corresponding to one or more traffic types or priorities, and wherein the one or more power control parameters of the power control configuration are based at least in part on a power control parameter set of the one or more power control parameter sets.

Aspect 9: The method of Aspect 8, wherein information identifying the association between the transmission configuration indicator state and the one or more power control parameter set lists is received in connection with transmission configuration indicator state activation signaling.

Aspect 10: The method of any of Aspects 1 to 9, wherein the power control configuration includes one or more power control parameters associated with a channel object.

Aspect 11: The method of Aspect 10, wherein the power control configuration includes one or more power control parameter sets corresponding to one or more traffic types or priorities.

Aspect 12: The method of any of Aspects 1 to 11, wherein the UE is configured with a plurality of resource sets or transmission types, wherein each resource set or transmission type, of the plurality of resource sets or transmission types, is associated with one or more power control parameter sets, wherein each power control parameter set corresponds to a traffic type or priority.

Aspect 13: The method of any of Aspects 1 to 12, wherein the power control configuration is based at least in part on a UE capability reported by the UE.

Aspect 14: A method of wireless communication performed by a user equipment (UE), comprising: receiving, from a base station, information configuring a set of resources associated with a set of pathloss reference signals; identifying a pathloss reference signal, of the set of pathloss reference signals, based at least in part on a UE capability; and communicating with the base station based at least in part on identifying the pathloss reference signal.

Aspect 15: The method of Aspect 14, wherein the pathloss reference signal is in a beam alignment state with an uplink beam of the UE based at least in part on satisfaction of a beam alignment condition, wherein the beam alignment condition is associated with at least one of: whether the pathloss reference signal corresponds to a spatial relation reference signal in an uplink or joint transmission configuration indicator state, whether the pathloss reference signal corresponds to a source reference signal of a quasi-co-location type-D parameter, whether a spatial relation reference signal is a direct or indirect quasi-co-location source of the pathloss reference signal, whether the pathloss reference signal is a direct or indirect quasi-co-location source of a spatial relation reference signal, or whether the pathloss reference signal and a spatial relation reference signal share a common quasi-co-location source.

Aspect 16: The method of Aspect 14, wherein the pathloss reference signal is a default common pathloss reference signal for a transmission configuration state that is not individually configured with the pathloss reference signal.

Aspect 17: The method of any of Aspects 14 to 15, wherein the UE is configured to report a support for a beam misalignment state.

Aspect 18: The method of any of Aspects 14 to 15, wherein the UE is not configured to support a beam misalignment state, and wherein the pathloss reference signal is configured to align to a spatial reference signal of a transmission configuration indicator state.

Aspect 19: The method of any of Aspects 14 to 15, wherein the UE does not report information identifying whether the UE supports a beam misalignment state, and wherein the pathloss reference signal is based at least in part on a default rule that the UE supports the beam misalignment state.

Aspect 20: The method of any of Aspects 14 to 15, wherein the UE is configured to support a beam misalignment state, and wherein the pathloss reference signal is selected from a configured pathloss reference signal list based at least in part on a set of selection criteria.

Aspect 21: The method of any of Aspects 14 to 15, wherein the UE is not configured to support a beam misalignment state, and wherein the pathloss reference signal is selected based at least in part on a source reference signal of a transmission configuration indicator state.

Aspect 22: The method of any of Aspects 14 to 21, wherein the pathloss reference signal is based at least in part on an identifier or a source reference signal of a transmission configuration state of the UE.

Aspect 23: A method of wireless communication performed by a base station, comprising: transmitting signaling identifying a plurality of power control configurations, wherein each power control configuration, of the plurality of power control configurations, includes one or more power control parameters; and receiving uplink traffic transmitted using a power control configuration, of the plurality of power control configurations, associated with a channel type.

Aspect 24: The method of Aspect 23, wherein the power control configuration is associated with a traffic type or a traffic priority.

Aspect 25: The method of any of Aspects 23 to 24, wherein the channel type is at least one of: a physical random access channel, a physical uplink control channel, a physical uplink shared channel, or a sounding reference signal.

Aspect 26: The method of any of Aspects 23 to 25, wherein power control configurations, of the plurality of power control configurations, differ with respect to at least one of: a power control parameter, or a pathloss reference signal.

Aspect 27: The method of any of Aspects 23 to 26, wherein the signaling includes one of radio resource control signaling, a medium access control (MAC) control element (CE) (MAC-CE), or downlink control information.

Aspect 28: The method of any of Aspects 23 to 27, wherein the power control configuration is selected from the plurality of power control configurations based at least in part on a transmitted indication or a static rule.

Aspect 29: The method of any of Aspects 23 to 28, wherein the power control configuration includes one or more power control parameters associated with a transmission configuration indicator state.

Aspect 30: The method of Aspect 29, wherein the transmission configuration indicator state is associated with one or more power control parameter set lists corresponding to one or more channel types, wherein a power control parameter set list, of the one or more power control parameter set lists, includes one or more power control parameter sets corresponding to one or more traffic types or priorities, and wherein the one or more power control parameters of the power control configuration are based at least in part on a power control parameter set of the one or more power control parameter sets.

Aspect 31: The method of Aspect 30, wherein information identifying the association between the transmission configuration indicator state and the one or more power control parameter set lists is transmitted in connection with transmission configuration indicator state activation signaling.

Aspect 32: The method of any of Aspects 23 to 31, wherein the power control configuration includes one or more power control parameters associated with a channel object.

Aspect 33: The method of Aspect 32, wherein the power control configuration includes one or more power control parameter sets corresponding to one or more traffic types or priorities.

Aspect 34: The method of any of Aspects 23 to 33, further comprising: configuring a user equipment (UE) with a plurality of resource sets or transmission types, wherein each resource set or transmission type, of the plurality of resource sets or transmission types, is associated with one or more power control parameter sets, wherein each power control parameter set corresponds to a traffic type or priority.

Aspect 35: The method of any of Aspects 23 to 34, wherein the power control configuration is based at least in part on a user equipment capability.

Aspect 36: A method of wireless communication performed by a base station, comprising: transmitting, to a user equipment (UE) information configuring a set of resources associated with a set of pathloss reference signals; configuring a pathloss reference signal, of the set of pathloss reference signals, for the UE based at least in part on a UE capability; and communicating with the UE based at least in part on configuring the pathloss reference signal.

Aspect 37: The method of Aspect 36, wherein the pathloss reference signal is in a beam alignment state with an uplink beam of the UE based at least in part on satisfaction of a beam alignment condition, wherein the beam alignment condition is associated with at least one of: whether the pathloss reference signal corresponds to a spatial relation reference signal in an uplink or joint transmission configuration indicator state, whether the pathloss reference signal corresponds to a source reference signal of a quasi-co-location type-D parameter, whether a spatial relation reference signal is a direct or indirect quasi-co-location source of the pathloss reference signal, whether the pathloss reference signal is a direct or indirect quasi-co-location source of a spatial relation reference signal, or whether the pathloss reference signal and a spatial relation reference signal share a common quasi-co-location source.

Aspect 38: The method of any of Aspects 36 to 37, wherein the pathloss reference signal is a default common pathloss reference signal for a transmission configuration state that is not individually configured with the pathloss reference signal.

Aspect 39: The method of any of Aspects 36 to 38, further comprising: receiving, from the UE, reporting indicating support for a beam misalignment state.

Aspect 40: The method of any of Aspects 36 to 39, wherein the UE is not configured to support a beam misalignment state, and wherein the pathloss reference signal is configured to align to a spatial reference signal of a transmission configuration indicator state.

Aspect 41: The method of any of Aspects 36 to 39, wherein the UE does not report information identifying whether the UE supports a beam misalignment state, and wherein the pathloss reference signal is based at least in part on a default rule that the UE supports the beam misalignment state.

Aspect 42: The method of any of Aspects 36 to 39, wherein the UE is configured to support a beam misalignment state, and wherein the pathloss reference signal is selected from a configured pathloss reference signal list based at least in part on a set of selection criteria.

Aspect 43: The method of any of Aspects 36 to 39, wherein the UE is not configured to support a beam misalignment state, and wherein the pathloss reference signal is selected based at least in part on a source reference signal of a transmission configuration indicator state.

Aspect 44: The method of any of Aspects 36 to 43, wherein the pathloss reference signal is based at least in part on an identifier or a source reference signal of a transmission configuration state of the UE.

Aspect 45: An apparatus for wireless communication at a device, comprising a processor; memory coupled with the processor; and instructions stored in the memory and executable by the processor to cause the apparatus to perform the method of one or more of Aspects 1-13.

Aspect 46: A device for wireless communication, comprising a memory and one or more processors coupled to the memory, the one or more processors configured to perform the method of one or more of Aspects 1-13.

Aspect 47: An apparatus for wireless communication, comprising at least one means for performing the method of one or more of Aspects 1-13.

Aspect 48: A non-transitory computer-readable medium storing code for wireless communication, the code comprising instructions executable by a processor to perform the method of one or more of Aspects 1-13.

Aspect 49: A non-transitory computer-readable medium storing a set of instructions for wireless communication, the set of instructions comprising one or more instructions that, when executed by one or more processors of a device, cause the device to perform the method of one or more of Aspects 1-13.

Aspect 50: An apparatus for wireless communication at a device, comprising a processor; memory coupled with the processor; and instructions stored in the memory and executable by the processor to cause the apparatus to perform the method of one or more of Aspects 14-22.

Aspect 51: A device for wireless communication, comprising a memory and one or more processors coupled to the memory, the one or more processors configured to perform the method of one or more of Aspects 14-22.

Aspect 52: An apparatus for wireless communication, comprising at least one means for performing the method of one or more of Aspects 14-22.

Aspect 53: A non-transitory computer-readable medium storing code for wireless communication, the code comprising instructions executable by a processor to perform the method of one or more of Aspects 14-22.

Aspect 54: A non-transitory computer-readable medium storing a set of instructions for wireless communication, the set of instructions comprising one or more instructions that, when executed by one or more processors of a device, cause the device to perform the method of one or more of Aspects 14-22.

Aspect 55: An apparatus for wireless communication at a device, comprising a processor; memory coupled with the processor; and instructions stored in the memory and executable by the processor to cause the apparatus to perform the method of one or more of Aspects 23-35.

Aspect 56: A device for wireless communication, comprising a memory and one or more processors coupled to the memory, the one or more processors configured to perform the method of one or more of Aspects 23-35.

Aspect 57: An apparatus for wireless communication, comprising at least one means for performing the method of one or more of Aspects 23-35.

Aspect 58: A non-transitory computer-readable medium storing code for wireless communication, the code comprising instructions executable by a processor to perform the method of one or more of Aspects 23-35.

Aspect 59: A non-transitory computer-readable medium storing a set of instructions for wireless communication, the set of instructions comprising one or more instructions that, when executed by one or more processors of a device, cause the device to perform the method of one or more of Aspects 23-35.

Aspect 60: An apparatus for wireless communication at a device, comprising a processor; memory coupled with the processor; and instructions stored in the memory and executable by the processor to cause the apparatus to perform the method of one or more of Aspects 36-44.

Aspect 61: A device for wireless communication, comprising a memory and one or more processors coupled to the memory, the one or more processors configured to perform the method of one or more of Aspects 36-44.

Aspect 62: An apparatus for wireless communication, comprising at least one means for performing the method of one or more of Aspects 36-44.

Aspect 63: A non-transitory computer-readable medium storing code for wireless communication, the code comprising instructions executable by a processor to perform the method of one or more of Aspects 36-44.

Aspect 64: A non-transitory computer-readable medium storing a set of instructions for wireless communication, the set of instructions comprising one or more instructions that, when executed by one or more processors of a device, cause the device to perform the method of one or more of Aspects 36-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the terms “set” and “group” are intended to include one or more items and may be used interchangeably with “one or more.” Where only one item is intended, the phrase “only one” or similar language is used. Also, as used herein, the terms “has,” “have,” “having,” or the like are intended to be open-ended terms that do not limit an element that they modify (e.g., an element “having” A may also have B). Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A user equipment (UE) for wireless communication, comprising:

a memory; and one or more processors, coupled to the memory, configured to:

receive signaling identifying a plurality of power control configurations, wherein each power control configuration, of the plurality of power control configurations, includes one or more power control parameters; and transmit uplink traffic using a power control configuration, of the plurality of power control configurations, selected based at least in part on a channel type, wherein the power control configuration is based at least in part on the UE supporting beam misalignment.

2. The UE of claim 1, wherein the power control configuration is selected based at least in part on a traffic type or a traffic priority.

3. The UE of claim 1, wherein the channel type is at least one of:

a physical random access channel, a physical uplink control channel, a physical uplink shared channel, or a sounding reference signal.

4. The UE of claim 1, wherein power control configurations, of the plurality of power control configurations, differ with respect to at least one of:

a power control parameter, or a pathloss reference signal.

5. The UE of claim 1, wherein the one or more processors are further configured to:

select the power control configuration from the plurality of power control configurations based at least in part on a received indication or a static rule.

6. The UE of claim 1, wherein the power control configuration includes one or more power control parameters associated with a transmission configuration indicator state.

7. The UE of claim 6, wherein the transmission configuration indicator state is associated with one or more power control parameter set lists corresponding to one or more channel types, wherein a power control parameter set list, of the one or more power control parameter set lists, includes one or more power control parameter sets corresponding to one or more traffic types or priorities, and wherein the one or more power control parameters of the power control configuration are based at least in part on a power control parameter set of the one or more power control parameter sets.

8. The UE of claim 7, wherein information identifying the association between the transmission configuration indicator state and the one or more power control parameter set lists is received in connection with transmission configuration indicator state activation signaling.

9. The UE of claim 1, wherein the power control configuration includes:

one or more power control parameters associated with a channel object, and one or more power control parameter sets corresponding to one or more traffic types or priorities.

10. The UE of claim 1, wherein the UE is configured with a plurality of resource sets or transmission types, wherein each resource set or transmission type, of the plurality of resource sets or transmission types, is associated with one or more power control parameter sets, wherein each power control parameter set corresponds to a traffic type or priority.

11. A user equipment (UE) for wireless communication, comprising:

a memory; and one or more processors, coupled to the memory, configured to:

transmit a report indicating that the UE supports beam misalignment;

identify a pathloss reference signal based at least in part on the UE supporting beam misalignment; and communicate with a base station based at least in part on identifying the pathloss reference signal.

12. A base station for wireless communication, comprising:

a memory; and one or more processors, coupled to the memory, configured to:

transmit signaling identifying a plurality of power control configurations, wherein each power control configuration, of the plurality of power control configurations, includes one or more power control parameters; and receive uplink traffic transmitted using a power control configuration, of the plurality of power control configurations, associated with a channel type, wherein the power control configuration is based at least in part on a user equipment (UE) supporting beam misalignment.

13. The base station of claim 12, wherein the power control configuration is associated with a traffic type or a traffic priority.

14. The base station of claim 12, wherein the channel type is at least one of:

a physical random access channel, a physical uplink control channel, a physical uplink shared channel, or a sounding reference signal.

15. The base station of claim 12, wherein power control configurations, of the plurality of power control configurations, differ with respect to at least one of:

a power control parameter, or a pathloss reference signal.

16. The base station of claim 12, wherein the power control configuration is selected from the plurality of power control configurations based at least in part on a transmitted indication or a static rule.

17. The UE of claim 11, wherein the pathloss reference signal is in a beam alignment state with an uplink beam of the UE based at least in part on satisfaction of a beam alignment condition, wherein the beam alignment condition is associated with at least one of:

whether the pathloss reference signal corresponds to a spatial relation reference signal in an uplink or joint transmission configuration indicator state, whether the pathloss reference signal corresponds to a source reference signal of a quasi-co-location type-D parameter, whether a spatial relation reference signal is a direct or indirect quasi-co-location source of the pathloss reference signal, whether the pathloss reference signal is a direct or indirect quasi-co-location source of a spatial relation reference signal, or whether the pathloss reference signal and a spatial relation reference signal share a common quasi-co-location source.

18. The UE of claim 11, wherein the pathloss reference signal is a default common pathloss reference signal for a transmission configuration state that is not individually configured with the pathloss reference signal.

19. The UE of claim 11, wherein the UE is configured to support a beam misalignment state, and wherein the pathloss reference signal is selected from a configured pathloss reference signal list based at least in part on a set of selection criteria.

20. The UE of claim 11, wherein the pathloss reference signal is based at least in part on an identifier or a source reference signal of a transmission configuration state of the UE.

* * * * *